(12) United States Patent
Bimanand et al.

(10) Patent No.: US 8,257,830 B2
(45) Date of Patent: *Sep. 4, 2012

(54) ELECTRICALLY CONDUCTIVE PROTECTIVE LINER AND METHOD OF MANUFACTURE

(75) Inventors: Alexander Bimanand, Burbank, CA (US); Jose Mariscal, Quartz Hill, CA (US); John Short, Madison, AL (US)

(73) Assignee: PPG Industries Ohio, Inc., Cleveland, OH (US)

( * ) Notice: Subject to any disclaimer, the term of this patent is extended or adjusted under 35 U.S.C. 154(b) by 984 days.

This patent is subject to a terminal disclaimer.

(21) Appl. No.: 12/284,916

(22) Filed: Sep. 25, 2008

(65) Prior Publication Data

US 2010/0025533 A1 Feb. 4, 2010

Related U.S. Application Data

(60) Provisional application No. 61/085,408, filed on Jul. 31, 2008.

(51) Int. Cl.
| B32B 27/08 | (2006.01) |
| B32B 27/18 | (2006.01) |
| B32B 27/36 | (2006.01) |
| B32B 27/40 | (2006.01) |

(52) U.S. Cl. ............... 428/411.1; 428/412; 428/423.1; 428/480; 428/522

(58) Field of Classification Search ............ None
See application file for complete search history.

(56) References Cited

U.S. PATENT DOCUMENTS

| 3,017,386 | A | | 1/1962 | Brown, Jr. et al. |
| 3,180,781 | A | | 4/1965 | Ryan et al. |
| 4,234,664 | A | * | 11/1980 | Hendy ................ 428/520 |
| 4,465,736 | A | | 8/1984 | Nishihara et al. |
| 4,642,263 | A | * | 2/1987 | Culbertson .......... 428/336 |
| 5,084,132 | A | | 1/1992 | Smith |
| 5,213,828 | A | | 5/1993 | Winter et al. |
| 5,780,160 | A | | 7/1998 | Allemand et al. |
| 5,859,722 | A | | 1/1999 | Suga et al. |
| 5,939,188 | A | * | 8/1999 | Moncur et al. ........ 428/332 |
| 6,213,602 | B1 | | 4/2001 | Smarto |

(Continued)

FOREIGN PATENT DOCUMENTS

WO   WO 2007040352 A1 *  4/2007

OTHER PUBLICATIONS

International Search Report and Written Opinion dated Sep. 15, 2009 for PCT application No. PCT/US 2009/52009.
International Search Report and Written Opinion dated Sep. 23, 2009 for PCT application No. PCT/US 2009/052015.

*Primary Examiner* — Ramsey Zacharia
(74) *Attorney, Agent, or Firm* — Christie, Parker & Hale, LLP

(57) ABSTRACT

A protective liner includes a base layer that can be affixed to an aircraft canopy or other substrate, a conductive polymeric interlayer positioned over the base layer, and a conductive top layer containing a reactive organic salt, or a hygroscopic salt, positioned over the conductive polymeric interlayer. The substrate can also be treated with a multilayer stack (including a substrate base coat layer, a metal layer positioned over the substrate base layer, a metal oxide layer positioned over the metal layer, and a tie layer positioned over the metal oxide layer). The protective liner can be affixed to a pretreated substrate by lamination or other means to form an enhanced, multilayer stack having beneficial properties.

27 Claims, 2 Drawing Sheets

U.S. PATENT DOCUMENTS

| | | |
|---|---|---|
| 6,417,292 B1 | 7/2002 | Moriarity et al. |
| 6,690,564 B1 | 2/2004 | Haruta et al. |
| 7,093,307 B1 | 8/2006 | Smith |
| 2003/0054172 A1 | 3/2003 | Savu et al. |
| 2007/0002421 A1 | 1/2007 | Rukavina et al. |
| 2007/0029299 A1* | 2/2007 | Prone et al. ............ 219/203 |
| 2007/0224340 A1 | 9/2007 | Hatta et al. |
| 2007/0249088 A1 | 10/2007 | Ohmori et al. |
| 2008/0073622 A1 | 3/2008 | Housel |

\* cited by examiner

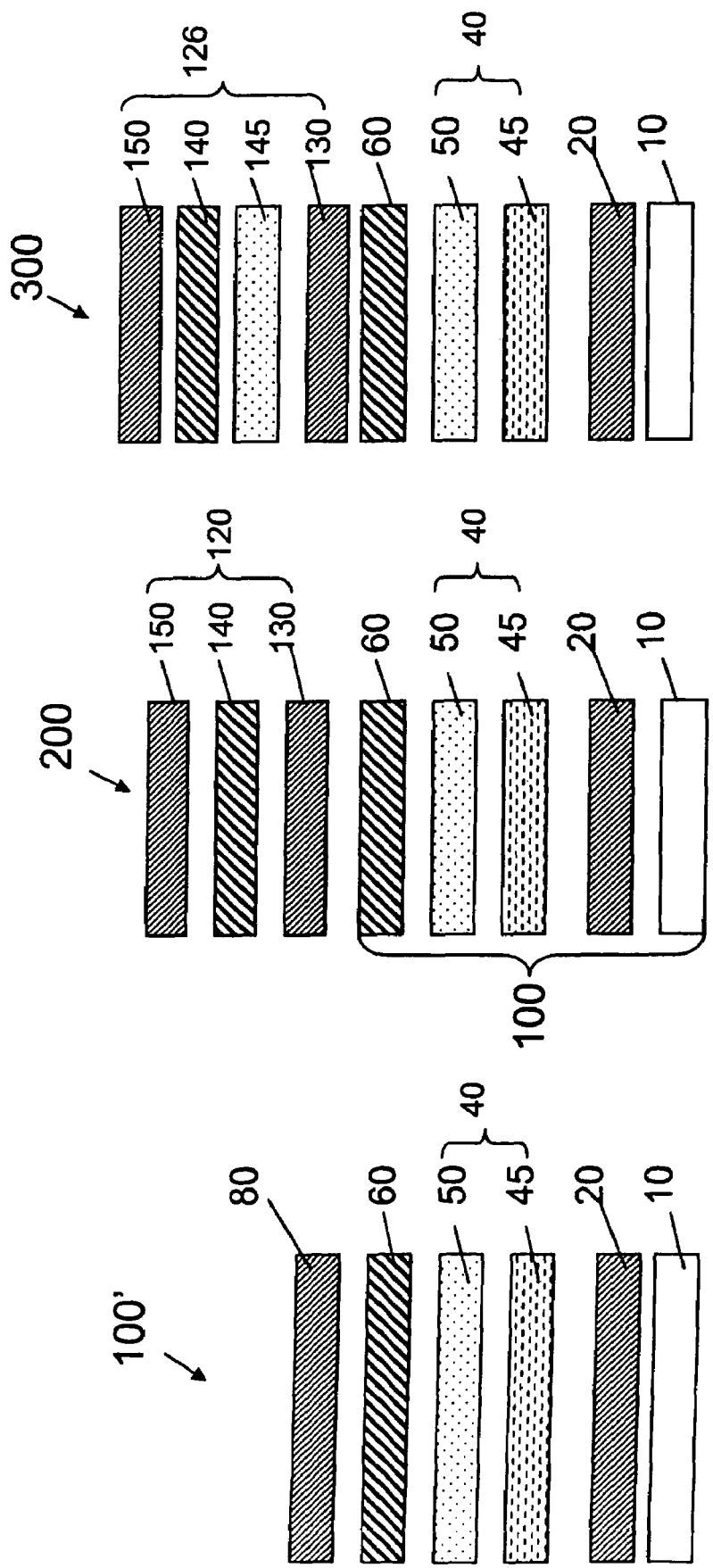

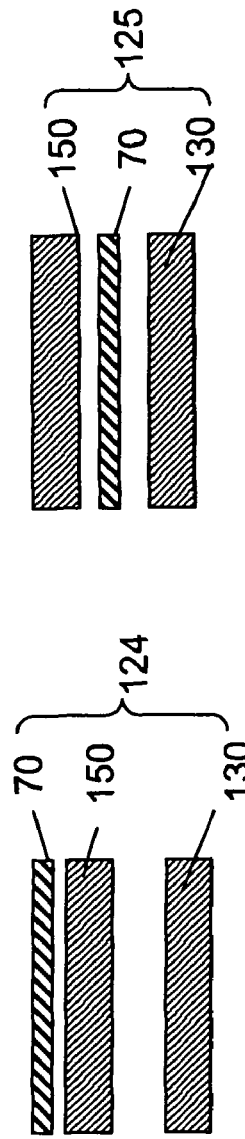
FIGURE 4
FIGURE 5
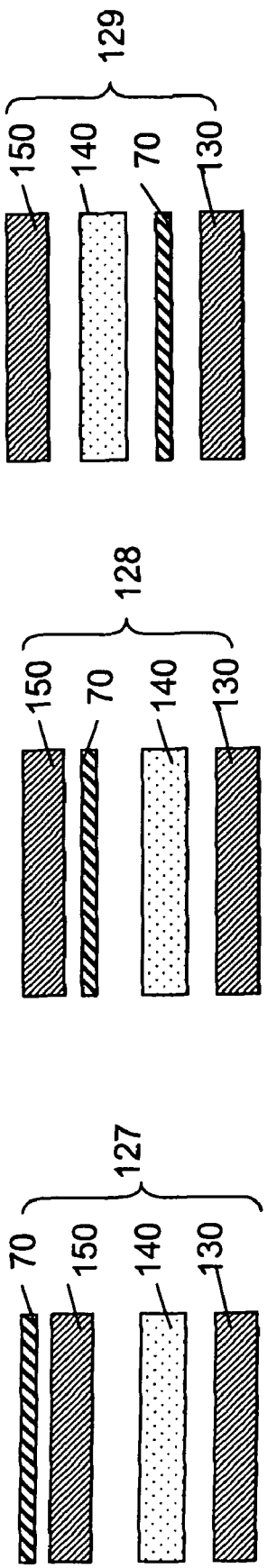
FIGURE 6
FIGURE 7
FIGURE 8

ELECTRICALLY CONDUCTIVE PROTECTIVE LINER AND METHOD OF MANUFACTURE

CROSS REFERENCE TO RELATED APPLICATION

This application claims the benefit of U.S. Provisional Application No. 61/085,408, filed on Jul. 31, 2008, the disclosure of which is incorporated fully herein by reference.

FIELD OF INVENTION

This invention relates generally to transparent compositions and coated transparencies and laminates incorporating such compositions. More particularly, the invention relates to an electrically conductive coating stack having anti-static or static-dissipative properties.

BACKGROUND OF INVENTION

Modern jet aircraft canopies, such as F-22 stealth fighter canopies, are made of polymeric materials. Such materials are preferred because of their light weight, high strength, and ease of shaping. However, most polymeric materials are not infrared-reflective and do not meet the requirements for stealth jet fighters, such as low surface resistance (high electrical conductivity) and the ability to withstand extreme weather conditions. As a result, both organic and inorganic coatings are employed to impart infrared reflection, conductivity, and other necessary stealth characteristics to the canopy.

Canopies for stealth jet fighters need to be electrically conductive so that they can drain or dissipate static electricity. A low surface resistance is desired to prevent a buildup of static charge, because static charge interferes with various electromagnetic field and radar attenuation functions of the aircraft. The canopies should be capable of de-icing and de-fogging, and should provide infrared reflection, radar attenuation, and electromagnetic pulse protection. To meet these requirements, current canopies are coated with several layers of materials to form a "metal conductive stack" or "multilayer stack" i.e., a multilayer coating containing at least one electrically conductive metal or metal oxide layer. However, current canopies do not have good static drain and have poor abrasion resistance.

FIG. 1 illustrates a conventional multilayer stack for a modern aircraft canopy. The multilayer stack 100' generally includes a substrate base layer 20, a metal conductive layer 40, a tie layer 60, and a top coat 80. The substrate base layer 20 provides adhesion between the metal conductive layer 40 and an aircraft canopy substrate 10 that lies underneath. In addition, the substrate base layer 20 covers imperfections such as scratches or dents that may exist on the surface of the substrate 10. Suitable materials that can be used for the substrate base layer 20 include UV-curable polymers such as acrylates.

The metal conductive layer 40 includes a silver layer 45 and a layer of indium tin oxide (ITO) 50 and helps dissipate static charge that can develop during flight and/or from lightning strikes. In addition, the metal conductive layer 40 provides for electromagnetic interference (EMI) shielding and radar attenuation. Further, the metal conductive layer 40 can be heated for de-fogging, de-misting, defrosting, or deicing, thereby providing a means of clearing any ice or moisture that may accumulate on the top surface of the stack or the inside surface of the canopy. Since the metal conductive layer 40 is prone to oxidation and degradation upon exposure to moisture, the top coat 80 is typically made of aliphatic polyurethane and is sufficiently durable and flexible to withstand the thermal contraction and expansion caused by extreme temperature conditions encountered during flight.

While the prior art multilayer stack provides adequate infrared reflection, EMP protection, and radar attenuation to the canopy, its service life is limited due to delamination and the formation of blue spots on the multilayer stack. In some aircraft, dark blue spots and signs of delamination are observed after only 25 hours of service, and it is not unusual for the entire canopy to be replaced after 80 hours of service because of severe delamination and blue spot formation. The blue spots result from oxidation of the silver layer 45. As moisture penetrates through the top coat 80, it reaches the silver layer 45 and causes it to corrode.

Despite the advances made to date in aircraft canopy coatings, a need still remains for electrically conductive coating stacks having greater durability and functionality.

SUMMARY OF THE INVENTION

A protective liner that can be applied to a coated or uncoated substrate, such as an aircraft canopy is provided. When applied to a canopy that already bears a multilayer stack, the liner plus the multilayer stack act in concert as an enhanced multilayer stack having a combination of beneficial properties.

In a first aspect, the liner comprises a polymeric base layer, a conductive polymeric interlayer positioned over the base layer, and a conductive top layer positioned over the conductive polymer layer. The liner can be applied to a coated or uncoated substrate by marrying the polymeric base layer to the substrate, using, for example, heat and pressure. The conductive polymeric interlayer generally has suitable surface resistance that facilitates the dissipation of static charge. The conductive top layer provides additional anti-static properties.

In some embodiments, the conductive top layer contains metal particles and/or particles of a conductive metal oxide. In other embodiments, the conductive top layer contains a quantity of an anti-static agent, or a hygroscopic salt, such as a quaternary ammonium salt, sufficient to provide a surface resistance below $10^{12}$ $\Omega/\square$, or more specifically about $10^8$ to $10^7$ $\Omega\square$ as measured under various testing conditions (i.e. $-40°$ F. to room temperature and from ambient to dehumidified conditions). In another embodiment, the conductive top layer contains a reactive organic salt, such as quaternary ammonium chloride with at least one reactive group, to further enhance the retention of the salt in the conductive top layer. Nonlimiting examples of reactive groups include —SH, —NH$_2$, and —OH.

In another aspect, a protective liner includes a base layer for laminating or marrying the protective liner to a substrate, a conductive bus bar for improving p-static charge dissipation, and a top layer. In one embodiment, the conductive bus bar is positioned over the top layer. In another embodiment, the conductive bus bar is positioned between the top layer and the base layer.

In another aspect, a protective liner includes a top layer, a conductive polymer interlayer, a base layer for marrying the liner to a substrate, and a conductive bus bar for improving p-static charge dissipation. In one embodiment, the conductive bus bar is positioned under the top layer. In another embodiment, the conductive bus bar is positioned under the conductive polymer interlayer.

When applied to an aircraft canopy or other substrate, the protective liner, alone or in combination with other layers previously applied to the substrate, forms a multilayer stack having a number of desirable properties.

BRIEF DESCRIPTION OF THE DRAWINGS

The accompanying drawings, together with the specification, illustrate various aspects and embodiments of the invention.

FIG. 1 is an exploded, cross-sectional view of a conventional, prior art multilayer stack for an aircraft canopy;

FIGS. 2 and 6 are exploded, cross-sectional views of multilayer stacks according to various embodiments of the invention; and FIGS. 3-5, and 7-8 are exploded, cross-sectional views of protective liners according to various embodiments of the invention.

DETAILED DESCRIPTION OF THE INVENTION

In the following description, and in the claims, various layers are described as being "positioned" over or "on" one or more additional layers, and this language simply denotes the relative positions of the layers. Thus, in some embodiments, two adjacent layers are literally right next to each other, while in other embodiments, the same two layers are separated by one or more additional layer(s). In each case, one of the two layers is considered to be "positioned over" or "on" the other layer, unless otherwise noted.

As used herein, the term "precoated substrate" refers to a substrate that has been protected (e.g., coated) with one or more layer(s) of metal particles and/or metal oxide to make the substrate conductive. The substrate can be made of glass or plastic, coated or uncoated, and may form a window, a windshield of a car, aircraft, or boat, a building, or another structure.

When various compositions are described, it is to be understood that the stated percentage or amount of each ingredient is provided on a "wet" basis prior to drying or curing, unless specified otherwise. Unless otherwise noted, the percentages given are in weight percent.

Throughout the text and the claims, use of the word "about" in relation to a range of values (e.g., "about 30 to 50 mils") is intended to modify both the high and low values recited, and reflects the penumbra of variation associated with measurement, significant figures, and interchangeability, all as understood by a person having ordinary skill in the art to which this invention pertains.

In a first aspect, a protective liner that can be applied to a precoated substrate to protect the metal and/or metal oxide conductive layer(s) therein is provided. In combination with the precoated substrate's conductive layer, the liner forms an enhanced multilayer stack having a number of desirable properties. With reference to FIG. 2, one embodiment of a multilayer stack 200 having a liner 120 disposed on a precoated substrate 100 is shown. The precoated substrate 100 includes a substrate 10; a substrate base layer 20 positioned over the substrate; a primary conductive layer 40 (composed of two sub-layers: a metal layer 45 and metal oxide layer 50), positioned over the base layer; and a tie layer 60, positioned over the primary conductive layer. The substrate base layer 20 covers minor defects and imperfections of the substrate. In addition, it promotes adhesion between the primary conductive layer 40 and the substrate 10. The primary conductive layer 40 provides static drain, UV absorption, IR reflection, radar attenuation, and electromagnetic pulse protection. The tie layer 60 protects the primary conductive layer by improving its weather resistance. It also improves the adhesion of the primary conductive layer to a protective liner 120 that is positioned over it.

Positioned over the precoated substrate is the protective liner 120. Because the primary conductive layer 40 in the pretreated substrate contains metal and/or metal oxide particles, it is susceptible to attack by air and water. The protective liner 120 is used to thwart such attack, and retards corrosion of the primary conductive layer. In addition, in some embodiments (described below) it provides additional functionality. The protective liner 120 also can include an antistatic agent that makes the protective liner 120 more conductive and thereby lowers the surface resistance of the multilayer stack 200. The protective liner 120 can be made separately and laminated onto the precoated substrate 100.

As shown in FIG. 2, the precoated substrate 100 includes a canopy substrate 10 with a substrate base layer 20 positioned over it. In one embodiment, the substrate base layer 20 is formed by flow coating. The metal conductive layer 40 is then formed on the precoated base layer by a process such as physical vapor deposition or magnetron sputtering. In the latter, a high voltage plasma discharge causes atoms to be ejected from a metal target. The metal atoms then strike the precoated substrate and form a thin, transparent metal layer. Since the coating is formed on an atomic scale, it is possible to produce uniform layers of films.

For certain metals, such as silver, the deposition process must be carried out at a relatively low temperature in order to avoid unwanted oxidation of the metal. Thus, for silver, the magnetron sputtering process is carried out at about 50 to 100 deg. F.

The metal oxide layer 50 is formed by the same sputtering process using ITO.

Because the silver layer 45 is prone to oxidation upon exposure to moisture, a tie layer 60 is applied almost immediately after the sputtering process. The tie layer is typically formed by flow coating. After allowing the tie layer 60 to dry, the precoated substrate 100 is ready to be coated or protected with the liner 120.

The protective liner 120 includes a base layer 130, a conductive polymeric interlayer 140, and an outer or "top" layer 150. The base layer 130 acts as a backing for the conductive polymeric interlayer 140 and the top layer 150, to be formed thereon. Further, the base layer 130 has sufficient flexibility and adhesiveness that it can conform and adhere to a curved or non-planar surface, such as an aircraft. Nonlimiting examples of suitable base layer materials include polyurethane, and polyurethane laminating adhesive.

A specific example of one such polyurethane is formed from a mixture of polytetramethylene ether glycol and liquid cycloaliphatic diisocyanate, at a weight ratio of about 55:38 (wt/wt) or, more generally, from about 50:45 to 60:30 wt/wt. Polytetramethylene ether glycol is sold by E.I. Dupont under the tradename Terathane 1000. A liquid cycloaliphatic diisocyanate is commercially available from Bayer under the tradename Desmodur W. Polytetramethylene ether glycol is a waxy white solid material, which melts to a clear colorless, viscous liquid. It reacts with the liquid cycloaliphatic diisocyanate to form a polyurethane resin.

Other components that can be present, in the mixture and/or the resulting base layer 130, include light- and UV-stabilizers, polymerization catalysts, modifiers, adhesion promoters, and chain extenders, in small (or trace) amounts. Nonlimiting examples of such additives include liquid hindered amines, octadecyl-3,5-di-tert-butyl-4-hydroxyhydrocinnamate, dimethyltin dilaurate catalyst, and aminosilanes.

In one embodiment, the composition from which the base layer 130 is formed includes 1,4-Butanediol at a concentration of about 4.66 wt %. In another embodiment, the composition includes ethylene glycol at a concentration of about 2.14 wt %.

The formed polyurethane resin is then pelletized, mixed and extruded to form the base layer 130. In one embodiment, the base layer is about 15 mils thick or, more generally, about 10 to 25 mils thick.

Positioned over the base layer 130 is a conductive polymeric interlayer 140, which improves the liner's ability to dissipate charge. A number of suitable conductive polymers are known. Nonlimiting examples include substituted and unsubstituted polypyrrole, polyaniline, polyacetylene, polythiophene, polyphenylene vinylene, polyphenylene sulfide, poly p-phenylene, and polyheterocycle vinylene. In one embodiment, the conductive polymer is poly(3,4-ethylene dioxythiophene)-poly(styrene sulfonate) ("PEDTO-PSS"), commercially available from Bayer.

Other conductive materials can also be used to promote dissipate charge in lieu of or in addition to the conductive polymeric interlayer 140. These conductive materials can either be incorporated in a polymeric resin. They can also be sprayed or sputtered on to form a thin conductive film with a sufficient thickness that does not cause significant reduction in light transmission. Nonlimiting examples of suitable conductive materials include carbon nanotubes, carbon graphine, and nano conductive ceramics, such as antimony tin oxide.

The conductive polymeric interlayer 140 can be prepared using various techniques such as spin-coating, coating from a flat film die, knife coating, dip coating, spray coating, electrostatic spray coating, roll coating, printing and other similar processes. In one embodiment, the conductive polymeric interlayer 140 is formed using a 1 wt % conductive polymer solution by a spray coating technique. The conductive polymer is mixed with a suitable solvent (e.g., a protic solvent, such as water) and sprayed on top of the base layer 130 until a sufficient film thickness is built up to obtain a surface resistance less than $10^6$ $\Omega/\square$, or more specifically, from $10^5$ to $10^4$ $\Omega/\square$. The solvent is then allowed to evaporate leaving behind a coat of the conductive polymer. Hence no heating or curing is required.

In one embodiment, the thin conductive polymeric interlayer 140 has a surface resistance less than $10^5$ $\Omega/\square$, or more specifically, from $10^2$ to $10^3$ $\Omega/\square$. At these surface resistance measurements, the conductive polymeric interlayer 140 is effective in dispersing and dissipating p-static charge, thereby mitigating build-up of static charge on the multilayer stack/substrate.

An outer surface of the conductive polymeric interlayer 140 is covered by a top layer 150, which is an external film or top coat that protects the conductive polymeric interlayer 140 as well as the entire multilayer stack 200. It is typically made of an organic resin, such as a polyol mixture. In one embodiment, the organic resin contains polyester.

For some applications, a thin top layer 150 is desirable because it does not add weight to the canopy and the aircraft as a whole. On the other hand, a thick layer provides better protection to the underlying coatings and may aid in dissipating static charge. In one embodiment, the top layer 150 is sufficiently thick so that it can provide adequate protection against UV light, humidity, abrasion, and rain erosion, i.e., from about 5 to 45 mils, or more particularly from 10 to 15 mils, or even more particularly, about 40 mils thick.

In some embodiments, the top layer 150 is also conductive, and includes an anti-static agent to aid in charge dissipation. Build-up of static charge not only interferes with various communication systems of the aircraft, but also can cause hot spots, which are eventually damaged by a rapid discharge of electrical current. A highly conductive top layer 150 is desirable because it can be used as a stand alone layer to dissipate accumulated static charge.

Nonlimiting examples of anti-static agents include electrically conductive materials such as metal or metal oxide particles. However, conventional metal or metal oxide particles are often too large and can impart an unwanted color or even interfere with or reduce canopy visibility. Accordingly, the top layer 150 incorporates a reactive organic salt, or a hygroscopic salt, such as a quaternary ammonium salt, rather than metal or metal oxide particles as the primary anti-static agents. Nonlimiting examples include quaternary ammonium chloride, particularly quaternary ammonium chloride having functional groups, such as —SH, —NH$_2$, and —OH. In one embodiment, quaternary ammonium chloride with two hydroxyl groups is employed. In yet another embodiment, an anti-static agent, commercially available from Advanced Materials and Coating Specialty under the tradename SuperStat 463 50% solids, is used. The use of an anti-static agent or more specifically, a quaternary ammonium salt enhances top coat resiliency and abrasion and rain erosion resistance. In addition, the conductivity of the quaternary ammonium salt-doped top layer is not pH-dependent.

The concentration of the reactive organic salt, or hygroscopic salt in the conductive top layer 150 should be high enough to provide a desired conductivity (i.e., a surface resistance less than about $10^8$ $\Omega/\square$), but not so high as to diminish the weatherability and light-transmission of the top coat. In some embodiments, the salt is a functional quaternary ammonium salt present in a concentration of about 35 wt % or, more generally, from about 25 to 60 wt %. At a concentration higher than 60 wt %, the quaternary ammonium salt is still bound within the polymeric matrix of the top layer 150, but the layer may be undesirably tacky.

In one embodiment, the top layer 150 can be formed by a casting process. The process involves the injecting the top layer composition between two plates, or two highly polished glass panes, which is then allowed to cure. The formed layer is then ready to be affixed to the conductive polymeric interlayer/base layer sub-assembly to form the protective liner 120 using a lamination technique. In one embodiment, the top layer 150 is draped over the base layer 130/conductive polymeric interlayer 140 subassembly, and put in a pressurized and heated chamber for a period of time sufficient to allow the top layer 150 to form a irreversible bond to the conductive polymeric interlayer 140 and/or the base layer 130. In one embodiment, the irreversible bond forms after about 2 hours at about 205° F. and about 150 psi. The resulting protective liner is less than 60 mil thick (about 55 mil).

The protective liner 120 provides abrasion and weather resistance, including protection against lightning strikes. In the event of a lightning strike, the protective liner dissipates energy and static charge. The protective liner also protects the underlying substrate from moisture penetration. The protective liner can be made ahead of time in rolls and later cut to size for laminating to an aircraft canopy or other substrate.

FIG. 3 shows another embodiment of a protective liner according to the invention. The liner 126 includes a base layer 130; a support layer 145 positioned over the base layer; and two conductive layers 140 and 150 positioned over the support layer. In combination with precoated substrate 100, the protective liner forms a multilayer stack 300. In one embodiment, the base layer 130 is adhesive and can be affixed directly to a substrate or pretreated substrate. Alternatively, it can be laminated to the substrate by applying heat and pressure, as described above. Further, the base layer 130 provides some flexibility so that it can conform to the curved or non-planar surface of the substrate. Suitable base layer materials are described above. In one embodiment, the base layer 130 contains or is a thermoplastic-elastomeric polyurethane (TPU), which has high tensile strength, rubber-like elasticity, exceptional structural memory, high resilience, and low temperature flexibility. The base layer 130 is about 15 mils thick or, more generally, from about 10 to 25 mils, and is formed according to any of the processes described above.

Positioned over the base layer 130 is a support layer 145. The support layer 145 is a plastic film made of polycarbonate materials, and has a thickness of about 40 mil, or, more generally, about 30 to 50 mils. Nonlimiting examples of polycarbonate materials include acrylic, and polycarbonate. In some embodiments, the support layer 145 is affixed to the outer surface of the base layer 130 by lamination, as described above (e.g., 2 hours @205° F. and 105 psi).

In the embodiment shown in FIG. 3, the liner includes a conductive polymeric interlayer 140 (as described above) and a top layer 150 positioned over the support layer 145. The conductive polymeric interlayer has a resistance of about $10^3$ $\Omega/\square$.

The top layer 150 is made of a polyurethane-based material in which is incorporated an anti-static agent, e.g., about 35 wt % of a hygroscopic salt, such as a quaternary ammonium salt with at least one functional group. More generally, the organic salt has a concentration of about 25 to 60 wt %, or, more specifically, about 45 to 50 wt %. In this embodiment, the top layer has a film thickness of about 5 mil, or, more generally, about 1 to 10 mil, and a surface resistance of about $10^6$ $\Omega/\square$.

The liner 150 can be made separately and then laminated onto a precoated substrate 100, as described above.

FIGS. 4 and 5 show protective liners having a conductive bus bar according to the invention. The liners 124 and 125 include a polymeric base layer 130, a polymeric top layer 150, and a conductive bus bar 70. The polymeric base layer 130 and top layer 150 are made of organic resins as described, respectively, above. The bus bar 70 is formed from a conductive paste, which is brushed along the edges of the liner. The conductive paste contains about 70 to 80 wt % silver mixed in an epoxy resin, or more particularly, an anhydride amine resin system. The liners 124 and 125 are capable of dissipating static charge because of the presence of the bus bar 70.

As shown in FIG. 4, the ground bus bar 70 is positioned on top of and in close proximity to the top layer 150. This arrangement is typically employed if the top layer is not conductive. However, in various embodiments, the top layer 150 is frequently doped with a quaternary ammonium salt or other reactive organic salt as described above, to provide p-static discharge capability. Accordingly, in various embodiments as shown in FIG. 5, the conductive bus bar 70 is positioned between the base layer 130 and the top layer 150 to form a protective liner 125. In this arrangement, the conductive bus bar 70 is still effective at dissipating static charge. When a static charge accumulates on the top layer 150, it is transferred out of the stack via the conductive bus bar 70.

FIGS. 6-8 show alternative embodiments of liners 127-129 according to the invention, in which the liners incorporate a conductive polymeric interlayer 145. In one embodiment, as shown in FIG. 6, the conductive bus bar is brushed along the edges of the top layer 150. In another embodiment, the conductive bus bar is positioned between top layer and the conductive polymeric interlayer. In yet another embodiment, the conductive bus bar is positioned between the conductive polymeric interlayer and the base layer 130 or alternatively, the support layer 145.

The liners can be laminated onto a precoated substrate 100 that has an incorporated conductive layer 40. In this case, the protective liner is placed on top of an uncoated or coated substrate (e.g., a canopy having a tie layer 60) and the whole assembly is put in a pressurized and heated chamber for a period of time (e.g., about 2 hours) until the protective liner forms a irreversible bond to the tie layer 60. Lamination chamber conditions at about 185° F. and 150 psi are representative. The resulting protective liner has a thickness of about 60 mils or, more generally, about 50 to 60 mils.

Although the invention has been described with reference to various preferred and exemplary embodiments, it is not limited thereto. Various modifications and/or equivalent arrangements can be made and are included within the scope of the invention, which is limited only by the appended claims and equivalents thereof.

What is claimed is:

1. A protective liner comprising:
   a polymeric base layer;
   a conductive polymeric interlayer positioned over the polymeric base layer; and
   a conductive top layer containing a reactive organic salt, positioned over the conductive polymeric interlayer.

2. The protective liner of claim 1, wherein the polymeric base layer comprises a polyurethane.

3. The protective liner of claim 1, wherein the polymeric base layer comprises the reaction product of a mixture of polytetramethylene ether glycol and liquid cycloaliphatic diisocyanate.

4. The protective liner of claim 3, wherein the polytetramethylene ether glycol and liquid cycloaliphatic diisocyanate are provided at a wt/wt ratio of from 50:45 to 60:30.

5. The protective liner of claim 1, wherein the polymeric base layer further comprises one or more components selected from the group consisting of liquid hindered amines, octadecyl-3,5-di-tert-butyl-4-hydroxyhydrocinnamate, dimethyltin dilaurate catalyst, aminosilanes, 1,4-butanediol, ethylene glycol, light-stabilizers, UV-stabilizers, polymerization catalysts, adhesion promoters, and chain extenders.

6. The protective liner of claim 1, wherein the conductive polymeric interlayer comprises a polymer selected from the group consisting of substituted and unsubstituted polypyrrole, polyaniline, polyacetylene, polythiophene, polyphenylene vinylene, polyphenylene sulfide, poly p-phenylene, and polyheterocycle vinylene.

7. The protective liner of claim 1, wherein the conductive polymeric interlayer has a surface resistance less than or equal to about $10^5$ $\Omega/\square$.

8. The protective liner of claim 1, wherein the conductive top layer comprises an organic resin incorporating a hygroscopic salt.

9. The protective liner of claim 8, wherein the organic resin is selected from the group consisting of polyurethanes and polyester.

10. The protective liner of claim 1, wherein the reactive organic salt comprises a quaternary ammonium salt.

11. The protective liner of claim 10, wherein the quaternary ammonium salt comprises at least one functional group.

12. The protective liner of claim 10, wherein the quaternary ammonium salt comprises two hydroxyl groups.

13. The protective liner of claim 10, wherein the quaternary ammonium salt is present in the conductive top layer in an amount of from 25 to 60 wt %.

14. The protective liner of claim 10, wherein the quaternary ammonium salt is present in the conductive top layer in an amount of about 35 wt %.

15. The protective liner of claim 1, wherein the conductive top layer has a surface resistance of less than about $10^{10}$ Ω/□.

16. The protective liner of claim 1, further comprising a support layer positioned between the polymeric base layer and the conductive polymeric interlayer.

17. The protective liner of claim 16, wherein the support layer comprises a polycarbonate film or an acrylic film.

18. The protective liner of claim 1, wherein the polymeric base layer is adhesive.

19. The protective liner of claim 1, further comprising a conductive bus bar positioned over the conductive top layer or between the polymeric base layer and conductive top layer.

20. The protective liner of claim 19, wherein the bus bar comprises a metal and an epoxy resin composite.

21. The protective liner of claim 20, wherein the metal is silver and the silver is present in an amount of about 70 to 80 wt % based on the total weight of the composite.

22. The protective liner of claim 1, further comprising a polymeric support layer.

23. The protective liner of claim 22, further comprising a conductive bus bar positioned between the support layer and the top layer.

24. A protective liner comprising:
a polymeric base layer;
a support layer positioned over the polymeric base layer;
a conductive polymeric interlayer positioned over the support layer; and
a conductive top layer containing a hygroscopic salt, positioned over the conductive polymeric interlayer.

25. In a pretreated aircraft canopy having a canopy, a protective multilayer stack including a base layer positioned over the canopy, a conductive layer positioned over the base layer, and a tie layer positioned over the conductive layer; the improvement comprising:
a protective liner affixed to an outer surface of the pretreated canopy, the protective liner comprising a polymeric base layer and a conductive top layer containing a hygroscopic salt, positioned over the polymeric base layer, wherein the protective liner further comprises a conductive polymeric interlayer positioned between the polymeric base layer and the conductive top layer,
wherein the protective liner further comprises a conductive polymeric interlayer positioned between the polymeric base layer and the conductive top layer.

26. A multilayer stack, comprising:
a substrate base layer;
a primary conductive layer positioned over the substrate base layer;
a base layer positioned over the primary conductive layer;
a conductive polymeric interlayer positioned over the base layer; and
a conductive top layer containing a hygroscopic salt, positioned over the conductive polymeric interlayer.

27. A multilayer stack, comprising:
a substrate base layer;
a metal layer positioned over the substrate base layer;
a metal oxide layer positioned over the metal layer;
a tie layer positioned over the metal oxide layer;
a base layer positioned over the primary conductive layer;
a conductive polymeric interlayer positioned over the base layer; and
a conductive top layer containing a hygroscopic salt, positioned over the conductive polymeric interlayer.

* * * * *

UNITED STATES PATENT AND TRADEMARK OFFICE
CERTIFICATE OF CORRECTION

PATENT NO.         : 8,257,830 B2
APPLICATION NO.    : 12/284916
DATED              : September 4, 2012
INVENTOR(S)        : Alexander Bimanand et al.

Page 1 of 1

It is certified that error appears in the above-identified patent and that said Letters Patent is hereby corrected as shown below:

In the Claims

Column 10, Claim 25, lines 11-13    Delete duplicate sentence

"wherein the protective liner further comprises a conductive polymeric interlayer positioned between the polymeric base layer and the conductive top layer."

Signed and Sealed this
First Day of October, 2013

Teresa Stanek Rea
*Deputy Director of the United States Patent and Trademark Office*